United States Patent
Martin et al.

(10) Patent No.: US 10,872,479 B1
(45) Date of Patent: Dec. 22, 2020

(54) SECURE LOG CAPTURE

(71) Applicant: FORD GLOBAL TECHNOLOGIES, LLC, Dearborn, MI (US)

(72) Inventors: Daryl Martin, Kitchener (CA); Christopher Sartori, Waterloo (CA); Glenn Vording, Waterloo (CA); Jonathan Niemi, Waterloo (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/672,955

(22) Filed: Nov. 4, 2019

(51) Int. Cl.
  *G08B 9/00* (2006.01)
  *G07C 5/08* (2006.01)
  *G05B 9/03* (2006.01)
  *G07C 5/00* (2006.01)

(52) U.S. Cl.
  CPC ............. *G07C 5/0816* (2013.01); *G05B 9/03* (2013.01); *G07C 5/008* (2013.01); *G07C 5/085* (2013.01)

(58) Field of Classification Search
  CPC ...... G07C 5/0816; G07C 5/008; G07C 5/085; G05B 9/03
  USPC .................................................... 340/386.02
  See application file for complete search history.

(56) References Cited

U.S. PATENT DOCUMENTS

| | | | |
|---|---|---|---|
| 8,068,951 B2 | 11/2011 | Chen et al. | |
| 10,395,444 B1* | 8/2019 | Edren | G07C 5/0808 |
| 10,600,096 B2* | 3/2020 | McQuade | G06Q 30/0611 |
| 2012/0053778 A1* | 3/2012 | Colvin | G06F 11/079 701/29.4 |
| 2012/0136527 A1* | 5/2012 | McQuade | G06Q 30/08 701/29.4 |
| 2014/0324786 A1* | 10/2014 | Li | G06F 16/215 707/690 |
| 2016/0350985 A1 | 12/2016 | McQuade et al. | |
| 2017/0309094 A1* | 10/2017 | Farahat | G07C 5/0841 |
| 2018/0005199 A1* | 1/2018 | Abuelsaad | G07C 5/0841 |
| 2018/0050704 A1* | 2/2018 | Tascione | B60W 10/04 |
| 2018/0131538 A1* | 5/2018 | Ando | G07C 5/008 |
| 2018/0275667 A1* | 9/2018 | Liu | B60W 50/029 |
| 2018/0276912 A1* | 9/2018 | Zhou | G07C 5/0808 |
| 2018/0365913 A1* | 12/2018 | Nix | G07C 5/0825 |
| 2019/0173902 A1* | 6/2019 | Takahashi | H04L 12/40 |
| 2019/0236863 A1* | 8/2019 | Kwak | G07C 5/0808 |
| 2019/0268376 A1* | 8/2019 | Park | G06F 21/577 |
| 2020/0057689 A1* | 2/2020 | Farahat | G06F 11/0709 |

* cited by examiner

*Primary Examiner* — Zhen Y Wu
(74) *Attorney, Agent, or Firm* — Michael Spenner; Brooks Kushman PC

(57) ABSTRACT

A vehicle includes a first controller; and a second controller, wherein the first controller is programmed to responsive to detecting a failure, generate a failure event, identify the second controller as related to the failure event, identify logs of the first controller and second controller as related to the failure event, collect logs of the first controller, and transmit a failure message including a request for the logs of the second controller to the second controller, and the second controller is programmed to responsive to receiving the failure message from the first controller, collect logs of the second controller as requested, and send a request for a security token to a server, and responsive to receiving the security token from the server, upload the logs of the second controller, as collected using the security token, to the server, and send the security token to the first controller.

20 Claims, 3 Drawing Sheets

US 10,872,479 B1

SECURE LOG CAPTURE

TECHNICAL FIELD

The present disclosure generally relates to vehicle log capturing. More specifically, the present disclosure relates to capturing vehicle logs from multiple nodes of a vehicle.

BACKGROUND

Vehicles have becoming more complex with the utilization of multiple controllers or electronic control units (ECUs) interconnected to provide various features such as navigation and communication. When a problem occurs, it may be difficult to pinpoint the route of the failure as one features may be enabled by various ECUs operating together and the root may be at any related ECU. Additionally, the vehicle may be remotely diagnosed via a server by uploading sending log data to the server. For instance, if a user cannot search points-of-interests (POIs) via a vehicle navigation system, the failure may be within any one or more of the software or hardware on the vehicle operating system, connectivity to the cloud, or within other components of the vehicle.

SUMMARY

In one or more illustrative embodiments of the present disclosure, a vehicle, includes a first controller; and a second controller, wherein the first controller is programmed to responsive to detecting a failure, generate a failure event, identify the second controller as related to the failure event, identify logs of the first controller and second controller as related to the failure event, collect logs of the first controller, and transmit a failure message including a request for the logs of the second controller to the second controller, and the second controller is programmed to responsive to receiving the failure message from the first controller, collect logs of the second controller as requested, and send a request for a security token to a server, and responsive to receiving the security token from the server, upload the logs of the second controller, as collected using the security token, to the server, and send the security token to the first controller, and the first controller is further programmed to responsive to receiving the security token from the second controller, upload the logs of the first controller, as collected using the security token, to the server.

In one or more illustrative embodiments of the present disclosure, a log collecting system for a vehicle includes a first controller; a second controller; and a third controller, wherein the first controller is programmed to responsive to detecting a failure, generate a failure event based on an analytics library, identify the second controller and the third controller as related to the failure event, identify logs of the first controller, the second controller and the third controller as related to the failure event, collect logs of the first controller, and transmit a failure message including a request for the logs of the second controller and logs of the third controller to the second controller, the second controller is programmed to responsive to receiving the failure message from the first controller, collect logs of the second controller as requested, and send the request for logs of the third controller to the third controller, send a request for security token to a server, and responsive to receiving the security token from the server, upload the logs of the second controller as collected using the security token to the server, and send the security token to the first controller and the third controller, the third controller is programmed to responsive to receiving the request for logs, collect the logs as requested, and upload the logs of the third controller as collected using the security token to the server, and the first controller is further programmed to responsive to receiving the security token from the second controller, upload the logs of the first controller as collected using the security token to the server.

In one or more illustrative embodiments of the present disclosure, a vehicle system for collecting diagnostics data includes an infotainment controller; a gateway controller; and a telematics control unit (TCU), wherein the infotainment controller is programmed to: responsive to detecting a failure, generate a failure event based on an analytics library and assign a global event identification (GEID) to the failure event, identify the gateway controller and the TCU as related to the failure event, identify logs of the infotainment controller, the gateway controller and the TCU as related to the failure event, collect logs of the infotainment controller and associate the logs with the GEID, and transmit a failure message including the GEID, a request for the logs of the gateway controller and logs of the TCU to the gateway controller, the gateway controller is programmed to responsive to receiving the failure message from the infotainment controller, collect logs of the gateway controller as requested and associate the logs with the GEID, send the GEID and the request for logs of the TCU to the TCU, send a request for security token to a server, and responsive to receiving the security token from the server, upload the logs of the gateway controller as associated with the GEID to the server using the security token, and send the security token to the infotainment controller and the TCU, the TCU is programmed to responsive to receiving the request for logs, collect the logs as requested and associate the logs with the GEID, and upload the logs of the TCU as associated with the GEID to the server using the security token, and the infotainment controller is further programmed to responsive to receiving the security token from the gateway controller, upload the logs of the infotainment controller as associated with the GEID to the server using the security token.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
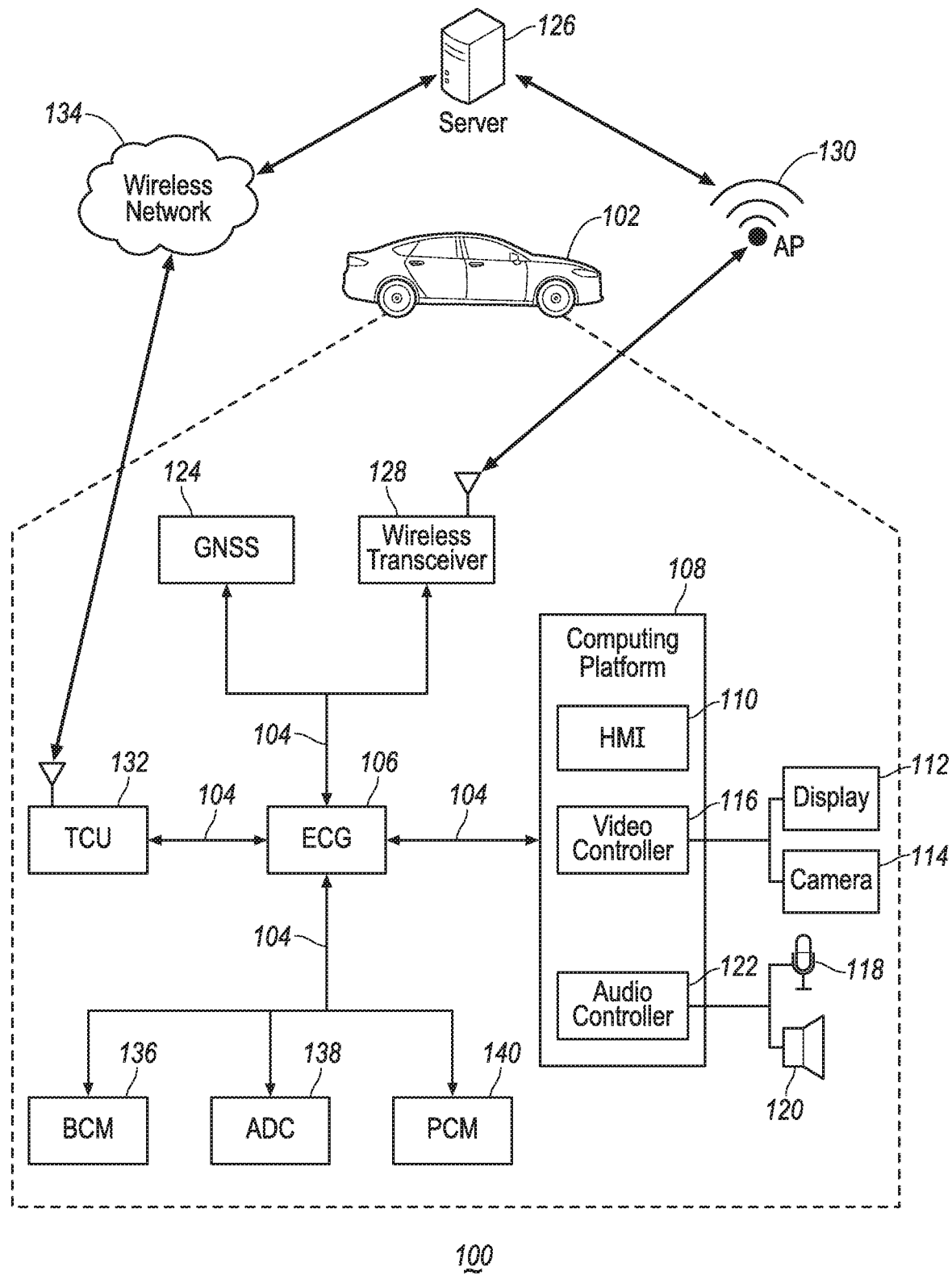
FIG. 1 illustrates an example block topology of a vehicle system of one embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle system for capturing logs from controllers. More specifically, the present disclosure proposes a vehicle system for collecting data logs from various controllers for diagnostic purposes.

Under current vehicle component diagnostic or troubleshooting scheme, vehicle log may be collected from one or more relevant ECUs and sent to a remote server for diagnostic when an error is detected. Vehicle data logs may be uncoordinated and large in size under such scheme. Furthermore, it may be difficult for technicians to navigate through uncoordinated vehicle logs to find the root of a failure. The present disclosure proposes a flexible vehicle architecture that facilitates the capture and coordination across multiple vehicle ECUs for diagnostic purposes.

Each controller or ECU may act as a node under the present architecture. Each node may be configured to collect vehicle logs from any other node to root cause failures and improve quality and efficiency of the vehicle system. The framework of the present disclosure may include two key components—a diagnostic agent and a diagnostic master. The diagnostic agent may be a single instance residing on each node responsible for communicating with the master, collecting logs, and handling node specific information. The diagnostic master may be a single instance residing on a single node responsible for controlling what each agent should do one their respective nodes.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, the vehicle 102 may include a plurality of controllers or ECUs, where each is connected to one of a plurality of subnet of in-vehicle network 104 to communicate with each other. The in-vehicle network 104 may include, but is not limited to, one or more of a controller area network (CAN), an Ethernet network, and a media-oriented system transport (MOST), as some examples. As an example, the in-vehicle network 104 may be configured as a "star" network in which an enhanced central gateway (ECG) 106 may be configured to coordinate data communication between various nodes as a central node to which all other nodes are connected. The ECG 106 may be connected with a computing platform 108 configured to perform instructions, commands, and other routines in support of the processes described herein. For instance, the computing platform 108 may be configured to execute instructions to provide features such as navigation, vehicle data collection, diagnostics and wireless communications. The computing platform 108 may be provided with various features allowing the vehicle occupants/users to interface with the computing platform 108. For example, the computing platform 108 may receive input from human-machine interface (HMI) controls 110 configured to provide for occupant interaction with the vehicle 102. As an example, the computing platform 108 may interface with one or more buttons (not shown) or other HMI controls configured to invoke functions on the computing platform 108 (e.g., steering wheel audio buttons, a push-to-talk button, instrument panel controls, etc.).

The computing platform 108 may also drive or otherwise communicate with one or more displays 112 and cameras 114 configured to provide visual output and input to/from vehicle occupants by way of a video controller 116. In some cases, the display 112 may be a touch screen further configured to receive user touch input via the video controller 116, while in other cases the display 112 may be a display only, without touch input capabilities. The computing platform 108 may also drive or otherwise communicate with one or more speakers 118 and microphones 120 configured to provide audio output and input to/from vehicle occupants by way of an audio controller 122.

The computing platform 108 may also be provided with navigation and route planning features via e.g. the HMI controls 110, and output planned routes and instructions via the speaker 118 and the display 112. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like.

The vehicle 102 may be configured to communicate with a remote server (a.k.a. cloud server or cloud) 126 via a wireless transceiver 128 through an access point 130 whenever available. The wireless transceiver 128 may be in communication with various wireless controllers (not shown) configured to support different communication protocols. For instance, the wireless transceiver 128 may be configured to support Wi-Fi, Bluetooth, radio-frequency identification (RFID), and/or near-field communication (NFC) compatible with the access point 130 to gain access to the remote server 126. Additionally or alternatively, the vehicle 102 may be further configured to communicate with the remote server 126 via a TCU 132 through a wireless network 134. The wireless network 134 may be in the form of various communication network e.g. a cellular network. It is noted that the terms access point and wireless network are used as general terms in the present disclosure and may include any computing network involving carriers, router, computers, controllers or the like configured to store data and perform data processing functions and facilitate communication between various entities. Furthermore, the term server 126 is also used as a general term in the present disclosure and may include any computing devices provided with processing, routing, storage capabilities configured to communicate with various entities and perform various operations.

The ECG 106 may be further configured to communicate with various ECUs configured to operate and control various features of the vehicle 102. For instance, The ECG 106 may be in communication with a body control module configured to control body operations such as doors and lights of the vehicle 102. The ECG 106 may be further configured to communicate with body control module 136 configured to control body features of the vehicle 102. The ECG 106 may be further configured to communicate with an autonomous driver controller 138 configured to control autonomous driving features of the vehicle 102. The ECG 106 may be further configured to communicate with a powertrain control module 140 configured to control powertrain operations such as motor and transmissions of the vehicle 102.

Figure 2:
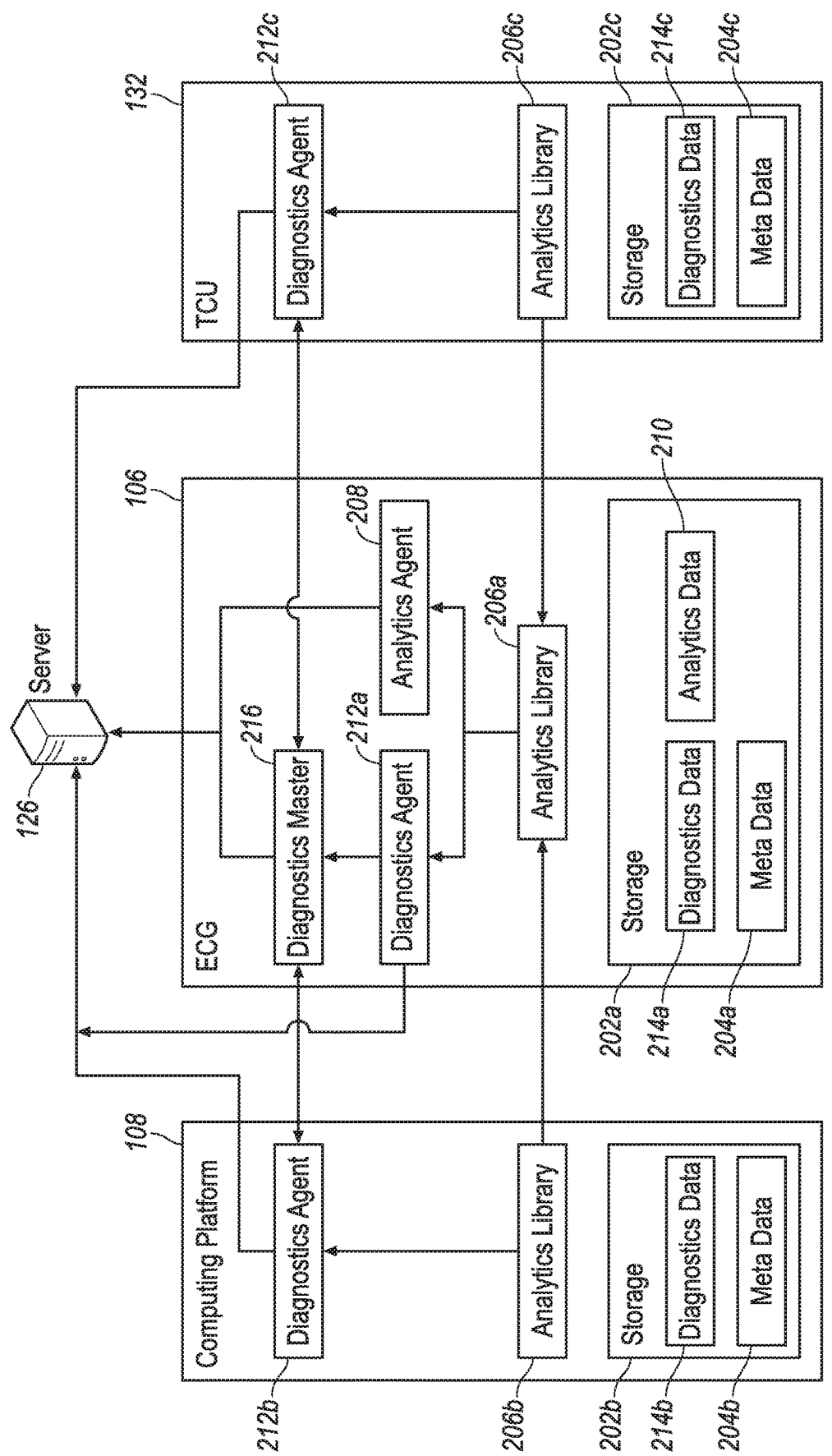
FIG. 2 illustrates an example schematic diagram of a vehicle diagnostics system of one embodiment of the present disclosure.

Referring to FIG. 2, a schematic diagram for a vehicle diagnostic system of one embodiment of the present disclosure is illustrated. With continuing reference to FIG. 1, in the present example, only three nodes are involved in the diagnostic although, more or less nodes may be involved in other examples. Furthermore, the diagnostic master resides on the ECG 106 in the present example. As illustrated, the three ECUs operated as nodes of the present example include an ECG 106, a computing platform 108 and a TCU 132. Each node may include a non-volatile storage medium 202 configured to store various data of each respective ECU. For instance, the storage 202 may be configured to store diagnostic event metadata 204 related to a diagnostic event. Each ECU may hold a local copy of the metadata 204 for each event it has generated. Furthermore, each ECU may be provided with an analytics library 206 configured as an interface for software to construct and send analytics and diagnostics events. The library 206 may be distributed locally into each respective ECU, or alternatively deployed as a shared library on each ECU communicating with each other.

The ECG 106, where the diagnostic master resides in the present example, may be further provided with an analytics agent 208 configured to receive and process analytics events generated by various ECUs and store the analytics data 210 in the storage 202a. The analytics agent 208 may be further configured to transmit events to the server 126 to further analysis. As discussed above, a diagnostic agent 212 may reside in each node of the vehicle 102 configured to perform ECU specific tasks such as collecting logs from the ECU at the time of or immediate before the failure and store the data as diagnostic data 214 in the storage 202 of each respective ECU. The diagnostic agent 212 may be further configured to collect and maintain a set of ECU specific metadata 204 used by both diagnostics and analytics to decorate events prior to delivering to the server 126. Each diagnostic agent 212 may be configured to upload its respective diagnostic events generated to the server 126 at the instruction of a diagnostic master 216. It is noted that depending on the specific configuration of each respective ECU, some ECUs may not be configured to communicate with the server 126 directly. Therefore, diagnostic agents 212 may be configured to individually or collectively upload to the server 126 via one ore more ECU having access to the server 126 such as the TCU 132 or the wireless transceiver 128. The diagnostic master 216 may reside only on a single ECU the same as the analytics agent at a given time. In the present example, the diagnostics mater 216 resides on the ECG 106. The diagnostic master 216 may be configured to arbitrate the upload of events by each ECU. The diagnostic master 216 may be further configured to maintain a master list of all diagnostic events that have been generated by each ECU and the current delivery status of each event. For connectivity security purposes, the diagnostic master 216 may be configured to collectively obtain an authentication token from the server 126 on behave of each diagnostic agent 212. The authentication token may used for authentications between each diagnostic agent 212 and the server 126.

The operations of the embodiment illustrated with reference to FIG. 2 may be applied to the following example. Responsive to detecting a failure/error has occurred on the navigation system (e.g. cannot search for POIs), the computing platform 108 may trigger a diagnostic event requesting log data from various related nodes of the vehicle 102. The identity of related nodes and requested logs may be predefined within software or the analytics library 206. In the present example, the there may be totally three nodes/ECUs related to such navigation system failure—the computing platform 108 configured to operate the navigation feature, the ECG 106 configured to gateway the communications between ECUs, and the TCU 132 configured to communicate with the cloud server 126 as failures in any of the three nodes may trigger the present specific issue. The logs as identified may include diagnostic data 214 consisting commands/test, and/or metadata 204 consisting raw data of each respective ECU. In the present example, the analytics agent 208 and the diagnostic master 216 both reside on the ECG 106. The analytics library 206b of the computing platform 108 may communicate with the diagnostic agent 212b regarding the requested log data. Responsive to receiving the communication message from the analytics library 206b, the diagnostic agent 212b may communicate to the diagnostic master 216 resided in the ECG 106 via the in-vehicle network 104 listing all logs that was requested. In other words, the diagnostic master 216 may be informed about the identity of nodes and logs related to the present event by a message from diagnostic agent 212b of the computing platform 108. Further may be included in the message is a GEID for the present event created by the diagnostic agent 212b of the computing platform 108—the originating node. The parent GEID may allow all of the events to be correlated into a single event on the server 126 via a parent/child relationship. In other words, logs captured from the computing platform 108 may be parent events, whereas logs captured from the ECG and TCU in the present example may be child events.

Responsive to receiving the message from the diagnostic agent 212b of originating node 108, the diagnostic master 216 may determine which log requests should be directed to each ECU and transmit a log request message over the in-vehicle network 104 to inform each relevant node what to collect. In the present example, the diagnostic agent 212c of the TCU 132 will be notified to capture the requested logs and send the logs to the diagnostic master 216. The diagnostic agent 212c may further receive the parent GEID from the diagnostic master 216 to associate the logs collected to the GEID. Similarly, the diagnostic agent 212a of the ECG 106 may be instructed to collect the logs as requested and associate the logs with the same GEID. For the computing platform 108 where current event is originated from, the requested logs may be directly sent to the diagnostic master 216 without having to receive a request as the log requests originates from the same node. The logs from different nodes may be collectively uploaded to the server 126 for diagnosis via the diagnostic master 216. Additionally or alternatively, each diagnostic agent 212 may be configured to individually upload the logs as requested to the server responsive to the request for logs message. After the events is transmitted to the server 126, each event may contain the log data, as well as both the parent GEID and child GEID to allow the server 126 to associate the data.

Figure 3:
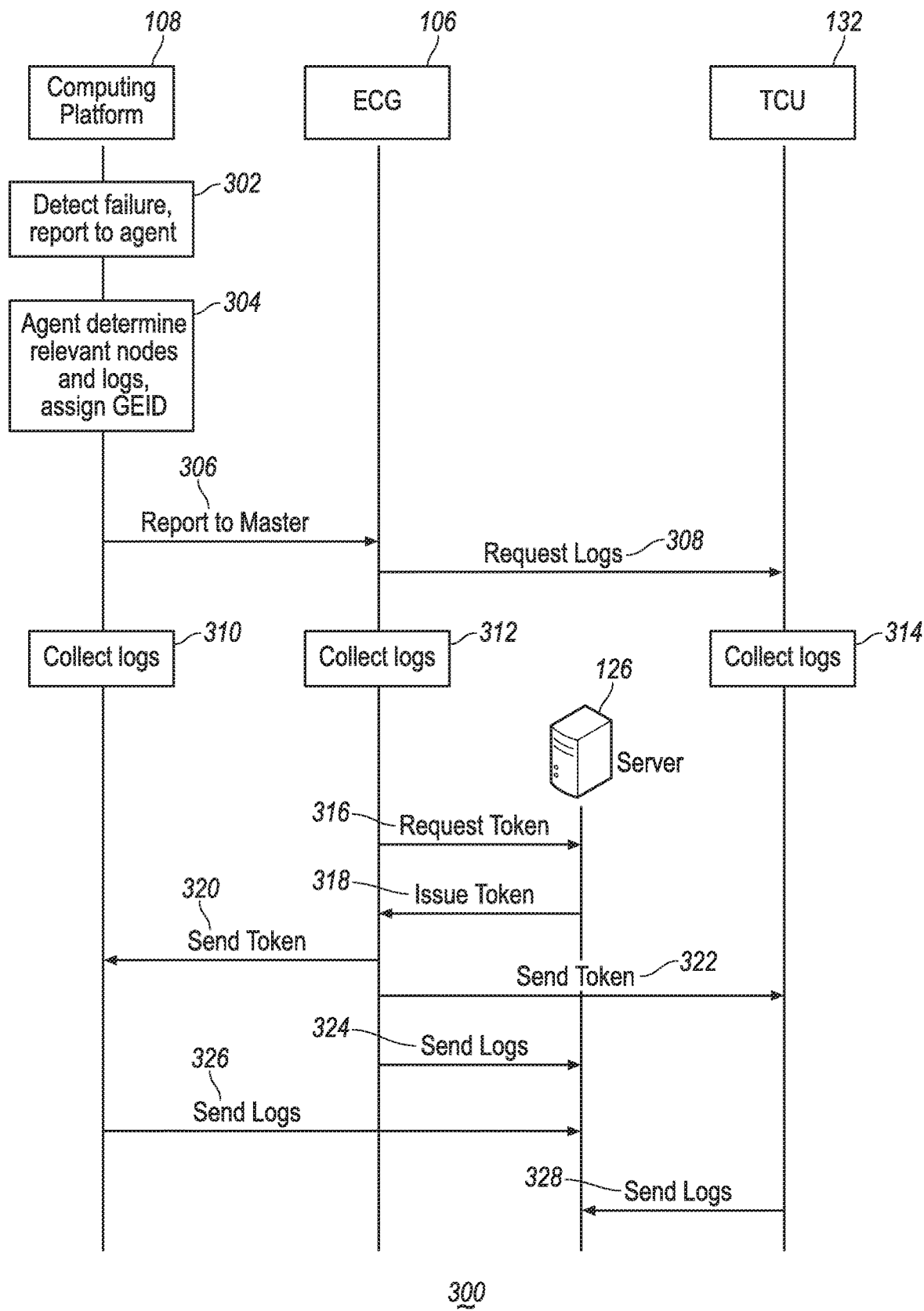
FIG. 3 illustrates an example data flow diagram for a diagnostics process of one embodiment of the present disclosure.

Referring to FIG. 3, an example flow diagram for a log collecting process 300 of one embodiment of the present disclosure is illustrated. With continuing reference to FIGS. 1 and 2, at operation 302, a client software (e.g. navigation software) of the computing platform 108 detects a failure and reports the failure to the diagnostic agent 212b residing on the computing platform 108. Responsive to receiving the failure report, the diagnostic agent 212b determines all nodes and logs from those nodes that are relevant to the failure event, and assigns a GEID to the event. At operation 306, the diagnostic agent 212b reports the failure event to the diagnostic master 216 via a report message. The report message may include information of the specific failure, the requested nodes and logs as determined by the diagnostic agent 212b, and the GEID. In the present example, the diagnostic master 216 resides on the ECG 106. Responsive to receiving the report message which identifies the nodes and logs, the diagnostic master 216 sends a request for logs to the diagnostic agent 212 of those nodes as identified at operation 308. In the present example, the TCU 132 is one of the nodes as identified. The report message may further identify the originating node—the computing platform 108—to be one of the nodes relevant to the failure event. However, since the diagnostic agent 212b of the computing platform 108 has already identified which of the logs to submit, the diagnostic master 216 does not need to send a request for logs back to the originating node. At operations 310, 312 and 314, the diagnostic agent 212 of each relevant nodes collects the logs as identified. The logs as requested may include diagnostic data 214 consisting commands/test, and/or metadata 204 consisting raw data of each respective ECU. Additionally, the logs may further include any other information that may be used to facilitate diagnosis and trouble-shooting, such as a screenshot, an audio or video recording. For instance, the diagnostic agent 212b of the computing platform 108 may collect a screenshot of the display 112 at the time when the failure occurred to provide to technician at the server side. Additionally, the diagnostic agent 212b may record audio sound and/or video images via the microphone 120 and the camera 114 respective for diagnostics purposes.

To send the logs to the server 126, each diagnostic agent 212 requires a security token for authentication purposes. The security token may be obtained collectively by the diagnostic master 216. At operation 316, the diagnostic master 216 send a request for security token to the server 126 and receives the security token at operation 318. At operation 320 and 322, the diagnostic master 216 sends the security token to the diagnostic agent 212 each respective node. responsive to receiving the security token, the diagnostic agents uploads the logs as collected to the server 126.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a first controller; and
a second controller,
wherein the first controller is programmed to:
responsive to detecting a failure, generate a failure event,
identify the second controller as related to the failure event,
identify logs of the first controller and second controller as related to the failure event,
collect logs of the first controller as identified, and
transmit a failure message including a request for the logs of the second controller to the second controller, and
the second controller is programmed to:
responsive to receiving the failure message from the first controller, collect logs of the second controller as requested, and send a request for a security token to a server, and
responsive to receiving the security token from the server, upload the logs of the second controller, using the security token, to the server, and send the security token to the first controller, and
the first controller is further programmed to:
responsive to receiving the security token from the second controller, upload the logs of the first controller, as collected using the security token, to the server.

2. The vehicle of claim 1, further comprising:
a third controller,
wherein the first controller is further programmed to:
identify the third controller as related to the failure event,
identify logs of the third controller as related to the failure event, and
include an identity and a request for the logs of the third controller in the failure message, and
the second controller is further programmed to:
send the request for logs of the third controller and the security token to the third controller, and
the third controller is further programmed to:
responsive to receiving the request for logs, collect the logs as requested, and
upload the logs of the third controller as collected using the security token to the server.

3. The vehicle of claim 2, wherein the second controller is an enhanced central gateway programmed to coordinate data communication between the first controller and the third controller.

4. The vehicle of claim 3, wherein the third controller is a telematics control unit programmed to communicate with the server via a wireless network, and upload logs from the first controller and the second controller to the server.

5. The vehicle of claim 2, further comprising:
a wireless transceiver programmed to communicate with the server via an access point, and upload logs from the first controller, the second controller, and the third controller to the server.

6. The vehicle of claim 2, further comprising:
an analytics library shared by a plurality of controllers, wherein the first controller is further programmed to:
generate the failure event using the analytics library.

7. The vehicle of claim 2, wherein the first controller is further programmed to:
generate a global event identification (GEID) for the failure event,
associate logs of the first controller with the GEID as parent events to upload to the server, and
send the GEID to the second controller in the failure message.

8. The vehicle of claim 7, wherein the second controller is further programmed to:
responsive to receiving the GEID, associate the logs of the second controller with the GEID as child events to upload to the server.

9. The vehicle of claim 1, wherein the first controller is further programmed to:
capture a screenshot of a display within a predefined time from the failure is detected and save the screenshot as one of the logs of the first controller.

10. The vehicle of claim 1, wherein the first controller is further programmed to:
record an audio sound via a microphone for a predefined time responsive to the failure and save the audio sound as one of the logs of the first controller.

11. The vehicle of claim 1, wherein the first controller is further programmed to:
record a video image via a camera for a predefined time responsive to the failure and save the video image as one of the logs of the first controller.

12. A log collecting system for a vehicle, comprising:
a first controller;
a second controller; and
a third controller,
wherein the first controller is programmed to:
responsive to detecting a failure, generate a failure event based on an analytics library,
identify the second controller and the third controller as related to the failure event,
identify logs of the first controller, the second controller and the third controller as related to the failure event,
collect logs of the first controller, and
transmit a failure message including a request for the logs of the second controller and logs of the third controller to the second controller,
the second controller is programmed to:
responsive to receiving the failure message from the first controller, collect logs of the second controller as requested, and send the request for logs of the third controller to the third controller,
send a request for security token to a server, and
responsive to receiving the security token from the server, upload the logs of the second controller as collected using the security token to the server, and
send the security token to the first controller and the third controller,
the third controller is programmed to:
responsive to receiving the request for logs, collect the logs as requested, and
upload the logs of the third controller as collected using the security token to the server, and
the first controller is further programmed to:
responsive to receiving the security token from the second controller, upload the logs of the first controller as collected using the security token to the server.

13. The log collecting system of claim 12, further comprising a wireless transceiver programmed to upload logs from the first controller, the second controller and the third controller to the server via a wireless connection.

14. The log collecting system of claim 12, wherein the first controller is further programmed to:
capture a screenshot of a display within a predefined time from the failure is detected and save the screenshot as one of the logs of the first controller.

15. The log collecting system of claim 12, wherein the first controller is further programmed to:
record an audio sound via a microphone for a predefined time responsive to the failure and save the audio sound as one of the logs of the first controller.

16. The log collecting system of claim 12, wherein the first controller is further programmed to:
record a video image via a camera for a predefined time responsive to the failure and save the video image as one of the logs of the first controller.

17. The log collecting system of claim 12, wherein the first controller is further programmed to:
generate a global event identification (GEID) for the failure event,
associate logs of the first controller with the GEID as parent events to upload to the server, and
send the GEID to the second controller in the failure message,
the second controller is further programmed to:
responsive to receiving the GEID, associate the logs of the second controller with the GEID as child events to upload to the server.

18. The log collecting system of claim 17, wherein the second controller is further programmed to:
send the GEID to the third controller, and
the third controller is further programmed to:
responsive to receiving the GEID, associate the logs of the third controller with the GEID as child events to upload to the server.

19. A vehicle system for collecting diagnostics data, comprising:
an infotainment controller;
a gateway controller; and
a telematics control unit (TCU),
wherein the infotainment controller is programmed to:
responsive to detecting a failure, generate a failure event based on an analytics library and assign a global event identification (GEID) to the failure event,
identify the gateway controller and the TCU as related to the failure event,
identify logs of the infotainment controller, the gateway controller and the TCU as related to the failure event,
collect logs of the infotainment controller and associate the logs with the GEID, and
transmit a failure message including the GEID, a request for the logs of the gateway controller and logs of the TCU to the gateway controller,
the gateway controller is programmed to:
responsive to receiving the failure message from the infotainment controller, collect logs of the gateway controller as requested and associate the logs with the GEID,
send the GEID and the request for logs of the TCU to the TCU, send a request for security token to a server, and
responsive to receiving the security token from the server, upload the logs of the gateway controller as associated with the GEID to the server using the security token, and send the security token to the infotainment controller and the TCU, the TCU is programmed to:
responsive to receiving the request for logs, collect the logs as requested and associate the logs with the GEID, and
upload the logs of the TCU as associated with the GEID to the server using the security token, and the infotainment controller is further programmed to:
responsive to receiving the security token from the gateway controller, upload the logs of the infotainment controller as associated with the GEID to the server using the security token.

20. The vehicle system of claim 19, wherein the infotainment controller is further programmed to:
capture a screenshot of a display within a predefined time from the failure is detected and save the screenshot as one of the logs of the infotainment controller.

\* \* \* \* \*